United States Patent
Bjerge et al.

(10) Patent No.: US 8,044,670 B2
(45) Date of Patent: Oct. 25, 2011

(54) APPARATUS AND METHOD FOR DETERMINING A RESONANT FREQUENCY OF A WIND TURBINE TOWER

(75) Inventors: Martin Bjerge, Herning (DK); Per Egedal, Herning (DK)

(73) Assignee: Siemens Aktiengesellschaft, Munich (DE)

( * ) Notice: Subject to any disclaimer, the term of this patent is extended or adjusted under 35 U.S.C. 154(b) by 427 days.

(21) Appl. No.: 12/381,496

(22) Filed: Mar. 12, 2009

(65) Prior Publication Data

US 2009/0230682 A1 Sep. 17, 2009

(30) Foreign Application Priority Data

Mar. 17, 2008 (EP) .................................... 08004938

(51) Int. Cl.
*G01R 27/28* (2006.01)
(52) U.S. Cl. ....................... 324/650; 324/652; 324/76.39; 324/76.76; 324/76.4; 324/76.44; 324/76.51; 324/76.61; 324/76.68; 324/76.74; 73/488; 708/300; 702/56; 702/77; 290/44; 290/55; 700/290; 700/291; 700/287; 416/41; 416/147; 415/1
(58) Field of Classification Search .................. 700/287, 700/290–291; 702/56, 141, 190, 191, 75–77; 290/44, 55; 324/650, 652, 76.39–76.76; 73/488; 708/300
See application file for complete search history.

(56) References Cited

U.S. PATENT DOCUMENTS

| | | | |
|---|---|---|---|
| 4,420,692 A | 12/1983 | Kos et al. | |
| 4,651,017 A | 3/1987 | Longrigg | |
| 5,561,364 A * | 10/1996 | Skudera, Jr. | 324/76.23 |
| 5,804,724 A * | 9/1998 | Lansberry et al. | 73/488 |
| 7,496,393 B2 * | 2/2009 | Diab et al. | 600/322 |
| 7,638,894 B2 * | 12/2009 | Stommel | 290/55 |
| 7,854,589 B2 * | 12/2010 | Nielsen et al. | 416/1 |
| 7,856,224 B2 * | 12/2010 | Petchenev et al. | 455/336 |
| 7,953,561 B2 * | 5/2011 | Musial et al. | 702/42 |
| 2003/0033336 A1 * | 2/2003 | Gremmert | 708/300 |
| 2006/0033338 A1 * | 2/2006 | Wilson | 290/44 |
| 2006/0140761 A1 * | 6/2006 | LeMieux | 416/61 |
| 2007/0176428 A1 * | 8/2007 | Nagao | 290/44 |
| 2008/0067815 A1 * | 3/2008 | Suryanarayanan et al. | 290/44 |
| 2008/0118342 A1 * | 5/2008 | Seidel et al. | 415/1 |
| 2008/0206051 A1 * | 8/2008 | Wakasa et al. | 416/41 |
| 2009/0099702 A1 * | 4/2009 | Vyas et al. | 700/287 |
| 2009/0162202 A1 * | 6/2009 | Nies et al. | 416/147 |
| 2010/0111693 A1 * | 5/2010 | Wilson | 416/1 |
| 2011/0148110 A1 * | 6/2011 | Egedal et al. | 290/44 |

FOREIGN PATENT DOCUMENTS

EP 1 531 376 A1 5/2005
EP 1 643 122 A2 4/2006

* cited by examiner

*Primary Examiner* — Jermele M Hollington
*Assistant Examiner* — Lamarr Brown

(57) ABSTRACT

An apparatus for determining a resonant frequency of a wind turbine tower is provided. The apparatus includes a processing unit configured to receive an acceleration measurement value, the acceleration measurement value representative of the acceleration of the wind turbine tower in the direction parallel to a rotor rotational axis of the wind turbine and/or in the direction perpendicular to both the rotor rotational axis and the tower axis of the wind turbine. The apparatus includes a memory configured to store a series of acceleration measurement values, and the processing unit includes a Fourier transform module configured to calculate a spectral vector based on calculating a convolution-based fast Fourier transform of the series of acceleration measurement values, and includes a resonant frequency calculation module configured to calculate the tower resonant frequency based on the calculated spectral vector.

19 Claims, 3 Drawing Sheets

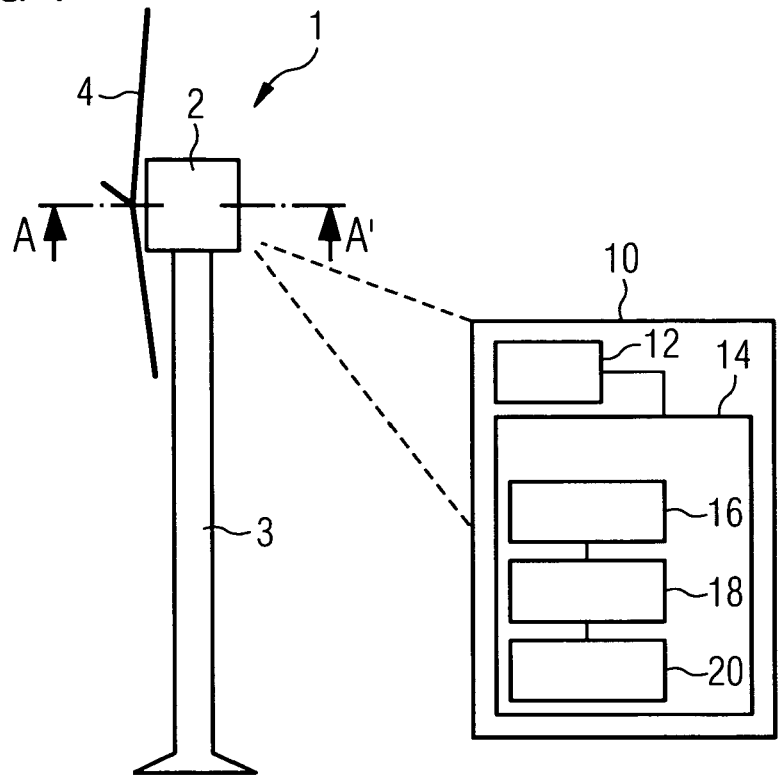
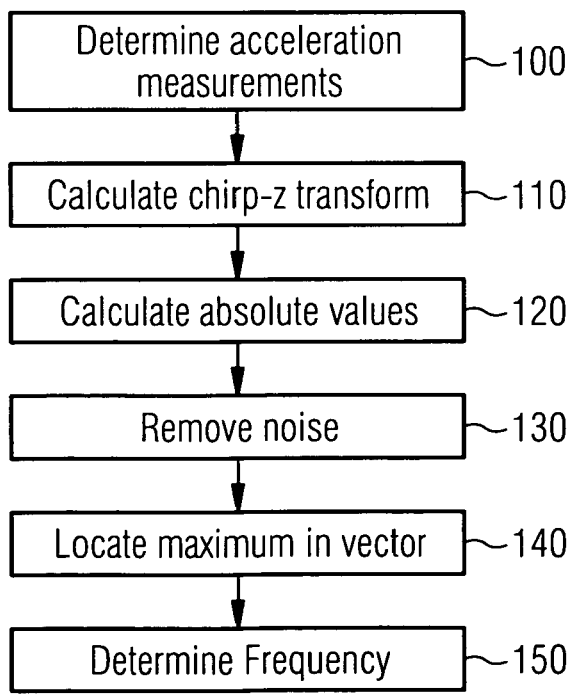

APPARATUS AND METHOD FOR DETERMINING A RESONANT FREQUENCY OF A WIND TURBINE TOWER

CROSS REFERENCE TO RELATED APPLICATIONS

This application claims priority of European Patent Office application No. 08004938.0 EP filed Mar. 17, 2008, which is incorporated by reference herein in its entirety.

FIELD OF INVENTION

The invention relates to an apparatus for determining a resonant frequency of a wind turbine tower, comprising a processing unit configured to receive an acceleration measurement value, said acceleration measurement value being representative of the acceleration of the wind turbine tower in the direction parallel to a rotor rotational axis of the wind turbine and/or in the direction perpendicular to both the rotor rotational axis and the tower axis, as well as a method therefore.

BACKGROUND OF INVENTION

In wind turbine systems known in the art, sudden changes in the velocity of the wind that acts on the rotor of the wind turbine causes its tower to sway back and forth and sideways. Such, oftentimes circle-like, oscillation of the wind turbine tower is known to significantly shorten the technical life period of the tower, and also to produce significant mechanical load in the yaw system and gearing.

Such oscillations can be still dramatically increased in cases of variable speed turbines, in which certain rotational speeds can cause oscillations that match the tower resonant frequency.

SUMMARY OF INVENTION

In order to avoid this adverse effect, systems of the art have been built strong enough to tolerate these extra forces, and wind turbine parts have been replaced more frequently due to the increased wear. However, such an approach demands a substantial extra technical effort, both regarding structural efforts and maintenance efforts.

In order to reduce such extra effort, it has been proposed to continuously obtain a tower acceleration measurement signal and to combine this signal with a rotor blade pitch control signal in U.S. Pat. No. 4,420,692. Thus, additional aerodynamic damping is provided by appropriately modulating the blade angle control.

To computationally determine the tower resonant frequency, additional computing resources such as powerful processors and memory are necessary. Consequently, systems are known that, locally in the wind turbine, merely measure the acceleration of the tower in direction of the rotor rotational axis, and store and forward these acceleration values to a remote central control office, where the resonant frequency is calculated by an operator and then manually entered into the turbine control system. In such systems, the necessary computing resources could be provided at relatively low cost and effort. However, there is additional effort in data communication, and for functioning properly, the system is dependent on working communication lines.

It is therefore an object of the invention to provide an apparatus and a method for determining a resonant frequency of a wind turbine tower that provides for accurate results while reducing the amount of required computing and storage capacity.

This object is achieved by the subject-matter of any one of claims.

An apparatus is provided for determining a resonant frequency of a wind turbine tower, comprising a processing unit configured to receive an acceleration measurement value, said acceleration measurement value being representative of the acceleration of the wind turbine tower in the direction parallel to a rotor rotational axis of the wind turbine and/or in the direction perpendicular to both the rotor rotational axis and the tower axis, characterized in that it comprises a memory configured to store a series of acceleration measurement values, and the processing unit comprises:

a Fourier transform module configured to calculate a spectral vector based on calculating a convolution-based fast Fourier transform of the series of acceleration measurement values, and a resonant frequency calculation module configured to calculate the tower resonant frequency based on the calculated spectral vector.

By performing a fast Fourier transform (FFT) based on a convolution, the present invention enables to obtain precise results of a given resolution while having to evaluate fewer points or samples. Thereby, the present invention provides for improved calculation efficiency.

Such performing the FFT based on a convolution can be implemented, for instance, by calculating a discrete Fourier transform (DFT) that has been reformulated as a convolution.

By evaluating the spectral vector thus obtained through the transform, the tower resonant frequency is obtained.

Hence the present invention provides a solution for efficiently determining a resonant frequency of a wind turbine tower. Computational effort and resource consumption are reduced for a given accuracy, or, at the same time, accuracy can be improved without applying additional technical effort.

As the person skilled in the art will acknowledge, in the entire present document, the terms "parallel" and "perpendicular" are to be understood as including a certain amount of derivation from its actual precise orientation. For instance, in practical configurations, the rotor axis of the wind turbine may be oriented upwards by a small angle relative to the horizontal direction to prevent the rotor blades from touching the wind turbine tower when wind pressure bends the rotor blades towards the tower.

In embodiments of the apparatus, the Fourier transform module can be configured to calculate said convolution-based fast Fourier transform based on a chirp z-transform (CZT), or a chirp transform algorithm (CTA), of the series of acceleration measurement values.

Such implementations are particularly well-suited for performing convolution with a prespecified impulse response. Further, another degree of flexibility is added, since a CZT or CTA can be used to compute any set of equally spaced samples of the Fourier transform on the unit circle.

In an embodiment, the processing unit further comprises a noise filter module to remove noise from the calculated spectral vector. Such noise filter module can be based on a low-pass filter.

By doing so, the data quality is enhanced for improved accuracy of results. General vibration, for instance caused by gearing in the nacelle, can be eliminated and thus does not adversely influence the calculation of the tower resonant frequency.

In implementations, the noise filter module can be based on a first-order-filter. This allows to implement the filter in a particularly efficient way, well suited to embedded computing platforms that are integrated in the wind turbine control system internal to the wind turbine.

In an embodiment, the noise filter module is configured such that a current filter output value accumulates its preceding filter output value and a bit-shifted difference between the preceding filter output value and the current acceleration measurement signal. The bit-shift therein is performed by an arithmetic shift in the direction of the least significant bit.

In practical realizations, the noise filter module can be implemented based on the C++ programming expression $$y \mathrel{+}= (x-y) \mathrel{>>} \text{bitshift};$$

wherein bitshift is a programming language constant or variable and is a specific positive integer value.

By expressing the filter in such a very brief programming statement, a compiler is enabled to optimize the correspondingly generated machine-code for the particular computing platform to a particularly high degree. Hence, efficiency is further enhanced while efforts for software maintenance are reduced to the minimum.

Generally, the noise filter module may operate based on the formula expression $$y(n) = y(n-1) + (x(n) - y(n-1)) \cdot b_0$$

In embodiments, the Fourier transform module can be configured to calculate the spectral vector based on calculating an absolute value of the convolution-based fast Fourier transform of the series of acceleration measurement values.

In embodiments, the resonant frequency calculation module can be configured to calculate the tower resonant frequency based on determining a maximum value of the spectral vector.

The invention according to a method of determining a resonant frequency of a wind turbine tower, wherein an acceleration measurement value is processed, said acceleration measurement value being representative of the acceleration of a wind turbine tower in the direction parallel to a rotor rotational axis of the wind turbine and/or in the direction perpendicular to both the rotor rotational axis and the tower axis, characterized in that it further comprises the steps of:

Selecting a series of acceleration measurement values;
Calculating a spectral vector based on calculating a convolution-based fast Fourier transform of the series of acceleration measurement values, and
Calculate the tower resonant frequency based on the calculated spectral vector.

The method can be embodied according to any of the features described in more detail below. The embodiments of the method correspond to the embodiments of the apparatus and produce corresponding technical effects, as explained above.

BRIEF DESCRIPTION OF THE DRAWINGS

The invention and embodiments are further explained in more detail below, referring to the following figures:

FIG. 1 shows a schematic overview of an embodiment of the apparatus related to a wind turbine;

FIG. 2 shows a schematic overview of an embodiment of the method;

DETAILED DESCRIPTION OF INVENTION

Figure 3:
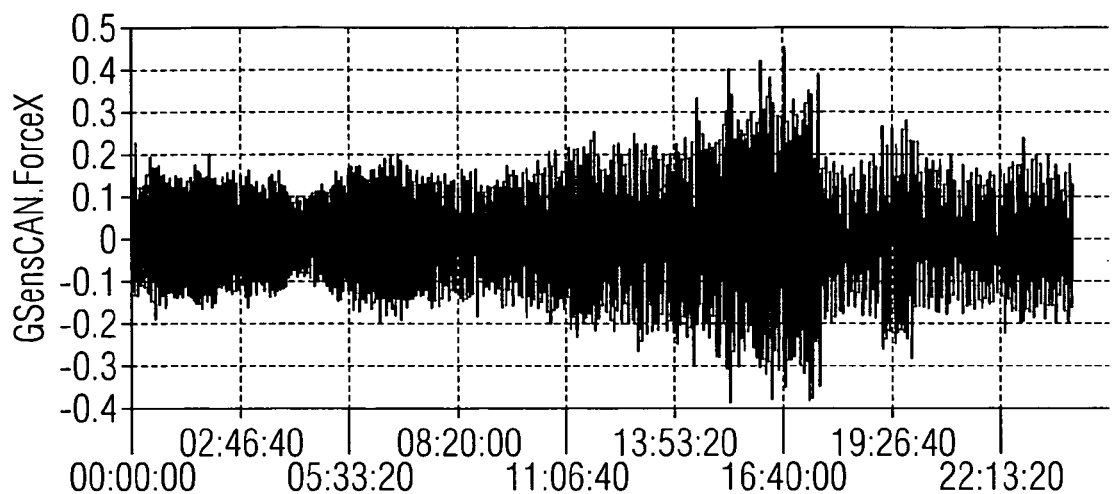
FIG. 3 shows an acceleration signal diagram over a time period of 24 hours.

FIG. 1 shows a schematic overview of an embodiment of the apparatus related to a wind turbine.

Wind turbine 1 comprises a nacelle 2 mounted on top of wind turbine tower 3. Nacelle 2 is coupled to rotor 4 at axis A-A', around which rotor 4 rotates. Nacelle 2 comprises additional equipment not illustrated in FIG. 1, such as gearing and control systems, such as to control the pitch of the blades of rotor 4.

Due to quick changes in wind forces acting parallel to axis A-A', tower 3 is caused to sway back and forth and sideways. This effect is increased by the additional weight of the nacelle, by the pitch control system, and particularly with variable speed turbines that might rotate at a speed producing a 3P-oscillation that matches the tower resonant frequency. A 3P-oscillation is the oscillation of the rotor wings running by the tower and comprises 3 periods per rotor period.

While 1P-oscillations are primarily based on unbalances in the rotor or the wings, 3P-oscillations are mainly based on wind turbulence, unevenly distributed wind speeds over the rotor (for instance, higher wind speed at the top of the rotor than at the bottom).

In nacelle 2, there is an acceleration sensor installed (not shown) which is connected to communicate with internal and external control systems. The sensor generates measurement values of the acceleration taking place in the direction parallel to axis A-A', as well as of the acceleration taking place in the direction perpendicular to both the rotor rotational axis and the tower axis.

The apparatus 1 for determining the resonant frequency or frequencies of the wind turbine tower 3 comprises a memory 12 and a processing unit 14 (such as a programmed CPU or customized Application Specific Integrated Circuit (ASIC)). Processing unit 14 comprises a Fourier transform module 16, a noise filter module 18 and a resonant frequency calculation module 20 which all can be implemented in a single program being executed in the processing unit or as separate modules, such as separate threads or processes, and all are connected to each other in order to share data and calculation results and access memory 12.

The specific configuration of memory 12, processing unit 14 and the modules 16 to 20 comprised therein, to execute the method steps proposed for the present system will be described in more detail with reference to FIG. 2.

FIG. 2 shows a schematic overview of an embodiment of the method to be executed by an apparatus of the present system.

In step 100, acceleration measurements are determined by accessing the stored series of measurement values. In order to obtain the series of values, a stream of measurement values can be received from an acceleration sensor, typically a two-way acceleration sensor, located in the wind turbine and stored in the memory using appropriate data structures such as a memory vector.

In step 110, Fourier transform module 16 calculates the spectral vector by performing the chirp z-transform algorithm (CZT) on the series of acceleration measurement values. The basis for calculating the chirp z-transform is a discrete Fourier transformation (DFT) reformulated as a convolution. Thus, instead of evaluating N-points that all are equally spaced on the unit circle, the CZT evaluates N-points with L-points that are spaced apart on a part of the unit circle. Thus, a higher resolution can be obtained while using fewer N-points, and the total calculation effort is reduced.

The principle used in this calculation can be expressed as follows:

$$\Phi_0 := 2 \cdot \pi \cdot \frac{F_{start}}{F_s} \quad (1.1)$$

$$\Phi_1 := 2 \cdot \pi \cdot \frac{F_{stop}}{F_s} \quad (1.2)$$

$$\phi_0 := (\Phi_1 - \Phi_0) \cdot \frac{1}{L} \quad (1.3)$$

$$k := 0 \ldots L-1 \quad (1.4)$$

$$z_k := e^{j\Phi_0} \cdot (e^{j\phi_0})^k \quad (1.5)$$

$$\underline{z_k} := e^{j(\Phi_0 + \phi_0 \cdot k)} \quad (1.6)$$

$$X(k) := \sum_{n=0}^{N-1}[x(n) \cdot (z_k)^{-n}] \quad (1.7)$$

$$\underline{X}(k) := \sum_{n=0}^{N-1}[x(n) \cdot e^{-j(\Phi_0 \cdot n + \phi_0 \cdot k \cdot n)}] \quad (1.8)$$

With $F_s$ being the sample frequency, $F_{start}$ being the start frequency of the frequencies to be analyzed, $F_{stop}$ being the end frequency of the frequencies to be analyzed, $\Phi_0$ being the angle on the unit circle for the start frequency, $\Phi_1$ being the angle on the unit circle for the end frequency, $\phi_0$ being the angle between the spectrum points in the unit circle, L being the number of points between the start and end frequency, and with N being the number of samples to be analyzed.

The calculation result of step 110 X(k) (formula 1.8) thus is the spectral vector of size L, being the complex spectrum of the acceleration measurement signal x(n). The spectral vector is updated upon each new N-point available.

In step 120, Fourier transform module 16 calculates the absolute value of the spectral vector, replacing its complex value with its absolute value. The spectral vector thus modified provides a spectrum of the acceleration measurement signals in the direction of axis A-A' representing the tower movements along the rotor rotational axis and in the direction perpendicular to both axis A-A' and the tower axis representing the tower movements perpendicular to both the rotor rotational axis and the tower axis. It is thus possible to detect the tower frequency at the signal based on the direction A-A', as well as from any other of the directions on the horizontal plane, since the resulting movements of the tower typically takes place in circles.

In step 130, noise filter module 18, which is designed as a first-order low-pass filter, removes noise from the signal, the noise originating from various vibration sources in the wind turbine. This is performed by the noise filter module 18 applying a filter function to each of the absolute values in the spectral vector.

The filter function implemented in noise filter module 18 renders the system very stable and allows for a very precise detection of the tower frequency. Since it is a first-order filter, it can be implemented very efficiently in high-level procedural programming languages, such as C, or C++. In C++, an one-line-implementation of the filter can be

```
y+=(x-y)>>bitshift;
``` following formula 2.6 below. This can be understood with the following inference:

$$H(s) = \frac{2 \cdot \pi \cdot F_c}{s + 2 \cdot \pi \cdot F_c} \quad (2.1)$$

$$H(z) = \frac{[1 - e^{-(2 \cdot \pi \cdot F_c) \cdot T_s}] \cdot z}{z - e^{-(2 \cdot \pi \cdot F_c) \cdot T_s}} \quad (2.2)$$

$$= \frac{1 - e^{-(2 \cdot \pi \cdot F_c) \cdot T_s}}{1 - [e^{-(2 \cdot \pi \cdot F_c) \cdot T_s}] \cdot z^{-1}}$$

$$= \frac{b_0}{1 - a_1 \cdot z^{-1}}$$

$$y(n) = b_0 \cdot x(n) - a_1 \cdot y(n-1) \quad (2.3)$$

$$a_1 = b_0 - 1 = e^{-(2 \cdot \pi \cdot F_c) \cdot T_s} \quad (2.4)$$

$$y(n) = b_0 \cdot x(n) - (b_0 - 1) \cdot y(n-1) \quad (2.5)$$

$$y(n) = y(n-1) + (x(n) - y(n-1)) \cdot b_0 \quad (2.6)$$

$$b_0 = 2^{-bitshift_s} \quad (2.7)$$

Formula 2.1 provides the transfer function for the low-pass filter, with Fc being the center frequency for the S-domain of the filter. Formula 2.2 correspondingly provides the transfer function, with Fc being the center frequency for the Z-domain of the filter. Formulae 2.3 to 2.6 present the corresponding differential equations for the filter.

In step 140, the resonant frequency calculation module 20 now finds the maximum value in the spectral vector, and in step 150, it determines the tower resonant frequency to be the maximum value identified in step 140.

Figure 4:
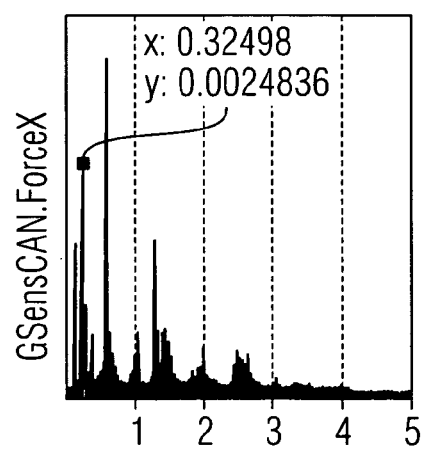
FIG. 4 shows the Fourier transform of the signal shown in FIG. 3.
Figure 5:
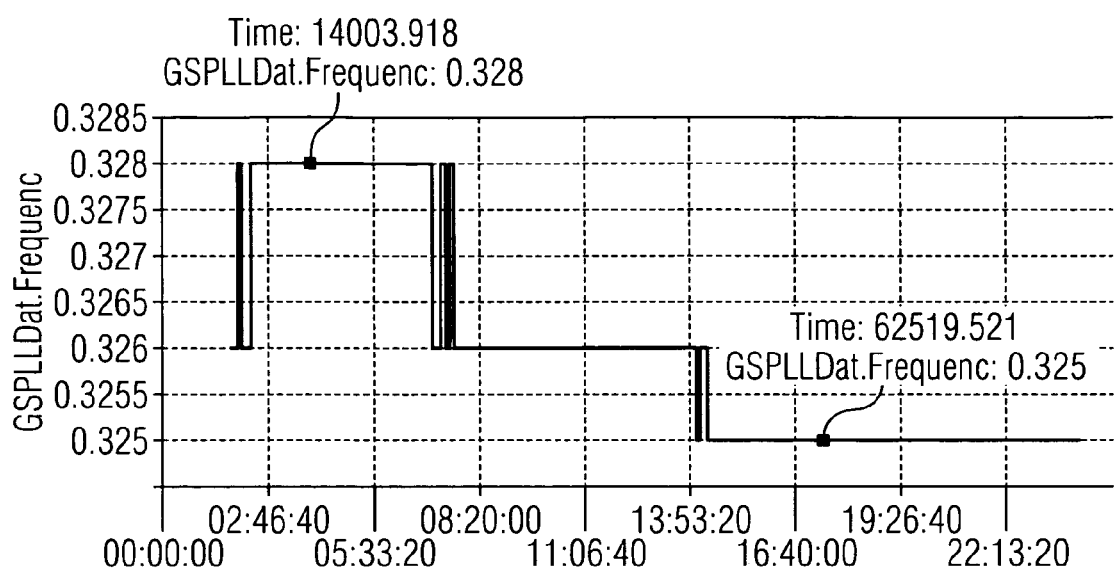
FIG. 5 shows the calculated tower frequency over a time period of 24 hours.

Practical results of the present system are demonstrated referring to the signal diagrams shown in FIGS. 3 to 5.

FIG. 3 shows an acceleration signal diagram over a time period of 24 hours. Here, tower oscillations occurring during the time period of a day are represented by the acceleration measurement signals generated by a acceleration sensor in the nacelle. As can be seen, tower acceleration varies over time.

The frequency spectrum shown in FIG. 4 is a Fourier transform of the signal of FIG. 3, and is given here as a reference analysis for the purposes of demonstration. It clearly identifies the spectral composition of the measured signal. Consequently, the present invention is expected to meet these analytical results with a good accuracy.

FIG. 5 shows the calculated tower frequency as a calculation result of the presently proposed system, over a time period of 24 hours, when the signal of FIG. 3 is input. The diagram clearly indicates signal values that represent the detected tower oscillation frequency over time.

Compared with the analytical spectrum of FIG. 4, at a reference point, it can be seen that while the spectrum of FIG. 4 gives a result of 0.325 Hz, the presently proposed system provides results ranging from 0.325 Hz to 0.328 Hz, thus providing a precision of 3 mHz or better. Even over longer periods of time, such as a 27 day period, the present system provides tower frequency calculation results within a tolerance of 5 mHz, with values ranging between 0.323 Hz and 0.328 Hz.

The presently proposed system provides for reliable and accurate identification of the tower resonant frequency of a wind turbine, while substantially reducing requirements as to calculation, storage and communication capacity. Thus, the present system can be easily integrated with an on-board control system within the wind turbine.

This can be achieved by appropriate configuration and/or programming of the processing unit of the on-board control system already present in the wind turbine, so as to execute the proposed method steps, or can be implemented by adding and connecting the proposed apparatus to the wind turbine control system.

For instance, the frequency value detected by the system can be used when controlling the speed by power reference. Typically, the rotor speed is controlled by power reference until the turbine is producing a maximum of power, after which the speed is further controlled by a pitch control system. Using the detected frequency at power reference speed control corresponds to the fact that the conditions to be avoided, that is, speeds where 1P or 3P matches the tower frequency, oftentimes take place at speed ranges wherein power reference speed control is used.

Embodiments of the invention may further comprise a 1P and/or 3P second-order notch filter (and, correspondingly, the step of filtering out 1P- and/or 3P-oscillations from the determined acceleration measurements) in order to avoid the present system from detecting 1P- and/or 3P-oscillations instead of the tower frequency, in cases of 1P- and/or 3P-oscillations being within the detector window ($F_{start}$-$F_{stop}$).

The invention claimed is:

1. An apparatus for determining a resonant frequency of a wind turbine tower, comprising:
   a memory configured to store a series of acceleration measurement values, each acceleration measurement value representative of an acceleration of the wind turbine tower in a direction parallel to a rotor rotational axis and/or in a direction perpendicular to both the rotor rotational axis and the tower axis of the wind turbine; and
   a processing unit that receives an acceleration measurement value, the processing unit comprising:
      a Fourier transform module that calculates a spectral vector based on calculating a convolution-based fast Fourier transform of the series of acceleration measurement values, and
      a resonant frequency calculation module that calculates the tower resonant frequency based on the calculated spectral vector.

2. The apparatus according to claim 1, wherein the Fourier transform module calculates the convolution-based fast Fourier transform based on a chirp z-transform of the series of acceleration measurement values.

3. The apparatus according to claim 1, wherein the processing unit further comprises a noise filter module to remove noise from the calculated spectral vector.

4. The apparatus according to claim 3, wherein the noise filter module is based on a low-pass filter.

5. The apparatus according to claim 3, wherein the noise filter module is based on a first-order-filter.

6. The apparatus according to claim 3, wherein the noise filter module is configured such that a current filter output value accumulates a preceding filter output value and a bit-shifted difference between the preceding filter output value and the current acceleration measurement signal.

7. The apparatus according to claim 6, wherein the bit-shift is performed by an arithmetic shift in the direction of the least significant bit.

8. The apparatus according to claim 3, wherein the noise filter module is based on the programming expression $y\mathrel{+}=(x-y)\mathrel{>>}bitshift;$ wherein bitshift is a specfic positive integer value.

9. The apparatus according to claim 3, wherein the noise filter module operates based on the formula expression $y(n)=y(n-1)+(x(n)-y(n-1))\cdot b_0.$ 10. The apparatus according to claim 1, wherein the Fourier transform module calculates the spectral vector based on calculating an absolute value of the convolution-based fast Fourier transform of the series of acceleration measurement values.

11. The apparatus according to claim 1, wherein the resonant frequency calculation module calculates the tower resonant frequency based on determining a maximum value of the spectral vector.

12. A method of determining a resonant frequency of a wind turbine tower, comprising:
   receiving an acceleration measurement value, the acceleration measurement value representative of an acceleration of a wind turbine tower in the direction parallel to a rotor rotational axis and/or in the direction perpendicular to both the rotor rotational axis and the tower axis of the wind turbine;
   selecting a series of acceleration measurement values;
   calculating a spectral vector based on calculating a convolution-based fast Fourier transform of the series of acceleration measurement values; and
   calculating the tower resonant frequency based on the calculated spectral vector.

13. The method according to claim 12, wherein the calculating the convolution-based fast Fourier transform is based on calculating a chirp z-transform of the series of acceleration measurement values.

14. The method according to claim 12, further comprising filtering noise from the calculated spectral vector.

15. The method according to claim 14, wherein a current filter output value is accumulated from a preceding filter output value and a bit-shifted difference between the preceding filter output value and the current acceleration measurement signal.

16. The method according to claim 14, wherein the noise filtering is configured based on the programming expression $y\mathrel{+}=(x-y)\mathrel{>>}bitshift;$ wherein bitshift is a specfic positive integer value.

17. The method according to claim 14, wherein the noise filtering is based on the formula expression $y(n)=y(n-1)+(x(n)-y(n-1))\cdot b_0.$ 18. The method according to claim 12, wherein the calculating the spectral vector comprises calculating an absolute value of the convolution-based fast Fourier transform of the series of acceleration measurement values.

19. The method according to claim 12, wherein the tower resonant frequency is calculated based on determining a maximum value of the spectral vector.

* * * * *